United States Patent
Geyer

(10) Patent No.: US 9,590,530 B2
(45) Date of Patent: Mar. 7, 2017

(54) CONTROLLING A MODULAR CONVERTER IN TWO STAGES

(71) Applicant: ABB TECHNOLOGY AG, Zurich (CH)

(72) Inventor: Tobias Geyer, Zurich (CH)

(73) Assignee: ABB Schweiz AG, Baden (CH)

( * ) Notice: Subject to any disclaimer, the term of this patent is extended or adjusted under 35 U.S.C. 154(b) by 22 days.

(21) Appl. No.: 14/629,674

(22) Filed: Feb. 24, 2015

(65) Prior Publication Data
US 2015/0171769 A1 Jun. 18, 2015
US 2016/0079883 A9 Mar. 17, 2016

Related U.S. Application Data

(63) Continuation of application No. PCT/EP2013/067791, filed on Aug. 28, 2013.

(30) Foreign Application Priority Data

Aug. 28, 2012 (EP) .................................... 12181995

(51) Int. Cl.
*H02M 7/537* (2006.01)
*H02M 7/483* (2007.01)
(Continued)

(52) U.S. Cl.
CPC .......... *H02M 7/537* (2013.01); *H02H 7/1227* (2013.01); *H02M 7/483* (2013.01);
(Continued)

(58) Field of Classification Search
CPC ............ H02M 1/12; H02M 1/32; H02M 7/49; H02M 7/53873; H02M 2001/325;
(Continued)

(56) References Cited

U.S. PATENT DOCUMENTS 4,423,367 A * 12/1983 Blaschke ................ H02P 21/10
318/803
5,619,406 A * 4/1997 Divan .................. H02M 7/4826
363/41
(Continued)

FOREIGN PATENT DOCUMENTS

DE 10 2005 060 354 A1 6/2007
EP 2 348 627 A1 7/2011
(Continued)

OTHER PUBLICATIONS

International Search Report (PCT/ISA/210) mailed on Oct. 30, 2013, by the European Patent Office as the International Searching Authority for International Application No. PCT/EP2013/067791.
(Continued)

*Primary Examiner* — Timothy J Dole
*Assistant Examiner* — Yusef Ahmed
(74) *Attorney, Agent, or Firm* — Taft Stettinius & Hollister LLP

(57) ABSTRACT

A modular converter having a plurality of converter modules for converting an input voltage into an output voltage to be supplied to a load by receiving a control input reference vector, a control input vector and a control input parameter vector; determining a control output reference vector from the control input reference vector, the control input vector and the control input parameter vector in a first control stage; and controlling the converter modules by generating switching signals based on the control output reference vector in a further control stage.

19 Claims, 3 Drawing Sheets

(51) Int. Cl.
*H02H 7/122* (2006.01)
*H02M 1/00* (2006.01)

(52) U.S. Cl.
CPC .............. *H02M 2001/0003* (2013.01); *H02M 2007/4835* (2013.01)

(58) Field of Classification Search
CPC . H02M 2001/0012; H02M 2001/0054; H02M 2007/4835
See application file for complete search history.

(56) References Cited

U.S. PATENT DOCUMENTS

| | | | | |
|---|---|---|---|---|
| 5,991,173 | A * | 11/1999 | Nishikawa | H02M 7/49 363/37 |
| 7,969,756 | B1 * | 6/2011 | Wu | G06F 17/5036 323/283 |
| 8,737,103 | B2 | 5/2014 | Kieferndorf et al. | |
| 2002/0195986 | A1 * | 12/2002 | Weigel | H02P 21/34 318/727 |
| 2003/0163296 | A1 * | 8/2003 | Richards | G06F 17/5036 703/14 |
| 2004/0057262 | A1 * | 3/2004 | Tanaka | H02M 7/487 363/132 |
| 2004/0151119 | A1 * | 8/2004 | Schierling | H02M 5/271 370/244 |
| 2005/0168198 | A1 * | 8/2005 | Maksimovic | H02M 1/4225 323/222 |
| 2007/0021873 | A1 | 1/2007 | Richards | |
| 2007/0139970 | A1 * | 6/2007 | Mese | H02M 7/487 363/13 |
| 2008/0266915 | A1 | 10/2008 | Eckardt | |
| 2009/0102436 | A1 * | 4/2009 | Escobar Valderrama | H02J 3/1857 323/207 |
| 2010/0020577 | A1 * | 1/2010 | Dommaschk | H02M 7/19 363/63 |
| 2010/0067266 | A1 * | 3/2010 | Dommaschk | H02M 7/483 363/64 |
| 2011/0227515 | A1 * | 9/2011 | Imura | H02P 21/0003 318/400.01 |
| 2012/0057632 | A1 * | 3/2012 | Sato | H04N 19/52 375/240.16 |
| 2012/0314466 | A1 * | 12/2012 | Goerges | H02M 7/53873 363/78 |
| 2013/0016549 | A1 * | 1/2013 | Kieferndorf | H02M 7/487 363/131 |
| 2013/0148392 | A1 * | 6/2013 | Inoue | H02M 7/10 363/68 |
| 2013/0155740 | A1 * | 6/2013 | Takubo | H02M 7/53871 363/98 |
| 2013/0170256 | A1 * | 7/2013 | Choi | H02M 7/48 363/37 |
| 2013/0229839 | A1 * | 9/2013 | Escobar | H02M 1/12 363/40 |
| 2013/0308235 | A1 * | 11/2013 | Davies | H02H 7/1257 361/62 |
| 2014/0226373 | A1 * | 8/2014 | Park | H02M 1/12 363/35 |
| 2014/0233276 | A1 * | 8/2014 | Fujita | H02M 1/12 363/34 |
| 2014/0328093 | A1 * | 11/2014 | Zhang | H02M 1/32 363/51 |
| 2014/0334206 | A1 * | 11/2014 | Valiani | H02M 7/487 363/97 |

FOREIGN PATENT DOCUMENTS

WO WO 2009/016113 A1 2/2009
WO WO 2011/036011 A1 3/2011

OTHER PUBLICATIONS

Written Opinion (PCT/ISA/237) mailed on Oct. 30, 2013, by the European Patent Office as the International Searching Authority for International Application No. PCT/EP2013/067791.
European Search Report mailed on Aug. 8, 2013 for Application No. 12181995.7.

* cited by examiner

CONTROLLING A MODULAR CONVERTER IN TWO STAGES

RELATED APPLICATIONS

This application claims priority under 35 U.S.C. §120 to International application PCT/EP2013/067791 filed on Aug. 28, 2013, designating the U.S., and claiming priority to European application 12181995.7 filed in Europe on Aug. 28, 2012. The content of each prior application is hereby incorporated by reference in its entirety.

FIELD OF THE INVENTION

The invention relates to a method for controlling a modular converter, a controller for controlling a modular converter and a modular converter with such a controller.

BACKGROUND OF THE INVENTION

Modular converters and in particular modular multi-level converters (M2LC) are used for synthesizing voltages to be supplied to a load, for example an electrical motor or an electrical grid. The modular structure of modular converters offers a number of advantages such as modularity, scalability, high output voltage and low output current distortions.

A standard approach to achieve closed-loop control of a modular converter is to divide the control problem into two hierarchical upper and lower stages or layers. The upper, first stage may be based on vector control with a modulator. The vector control scheme may operate in a dq reference frame. By manipulating the voltage reference, which is input to the modulator, closed-loop control of load currents may be achieved. For example, carrier-based pulse width modulation (PWM) or space vector modulation (SVM) may be used in a modulator. Circulating currents and/or an energy balance within converter branches may be addressed by adding additional control loops.

The lower control stage utilizes the redundancy in the converter states (i.e. groups of switching states that produce the same line to line voltage) in order to balance the capacitor voltages. The capacitor voltages may be sorted in an ascending/descending order of their voltage values. For a charging current the capacitors with the lowest voltages may be selected first, and conversely, the capacitors with the highest voltages may be prioritized for discharging currents.

DESCRIPTION OF THE INVENTION

It may be objects of the invention to simplify the development of controllers of modular converters, to provide more flexibility in the control objective of a modular converter, to minimize switching losses of a modular converter and/or to minimize the response time of a controller of a modular converter.

These objects are achieved by the subject-matter of the independent claims. Further exemplary embodiments are evident from the dependent claims and the following description.

An aspect of the invention relates to a method for controlling a modular converter.

The modular converter comprises a plurality of converter modules that may comprise semiconductor switches and at least one capacitor. The modular converter is adapted for converting at least one input voltage into at least one output voltage to be supplied to a load. For example, the modular converter may connect a grid with an electrical rotating machine like a motor or a generator or may interconnect two electrical grids. The modular converter may be a modular multi-level converter. The modular converter may be an AC-to-DC converter, a DC-to-AC converter, or an AC-to-AC converter.

According to an embodiment of the invention, the method for controlling the converter comprises the steps of: receiving a control input reference vector, a control input vector and a control input parameter vector; determining a control output reference vector from the control input reference vector, the control input vector and the control input parameter vector in a first control stage (or layer); and controlling the converter modules by generating switching signals from the control output vector in a further control stage or control layer. The different control stages or control layers may be implemented in different controllers.

The control method may supersede the vector control scheme as described above. The control input reference vector (i. e. a reference vector input to the first control stage) may be a current reference vector and the control input vector may be an actual current vector that may have been estimated or measured from actual currents and/or voltages in the modular converter.

It has to be noted that a vector may contain only one entry, i.e. that a vector comprises only a value. However, usually, a vector may contain at least two entries.

The control output reference vector (i.e. a reference vector output from the first control stage) may be a voltage reference vector that is input to the next control stage, which may be a modulator. In other words, the variable manipulated by the first control stage may be a real-valued (voltage) reference for a modulator.

According to an embodiment of the invention, the control output reference vector is determined by: predicting at least one future state of the modular converter with a prediction model of the converter; optimizing the at least one future state with respect to an objective function; and determining the control output reference vector from the future state.

Summarized, the first control stage is adapted for predicting the evolution of an internal state vector of the modular converter (and optionally the load) and of the control output reference vector and for optimizing the control output reference vector such that the future state, or a subset of it, approaches the control input reference vector and that further control objectives like, for example, minimal switching efforts or keeping some variables within some constraints, are achieved. In such a way, a next control output reference vector may be determined from which the next switching state can be derived.

The prediction model may be a mathematical model of the modular converter and optionally the load that is implemented in the first control stage. The prediction model may be adapted for calculating the future state of the converter based on an actual state of the converter. An (actual and/or future) state of the modular converter may comprise current values and/or voltage values of the modular converter. The actual state may comprise the control input vector and the control input parameter vector. The future state may comprise an evolution of the control input vector and the control input parameter vector.

It has to be noted that the prediction horizon of the prediction model needs not be one time step but may have any length. The prediction model may allow the first stage to predict the system response of control actions, using a prediction horizon of any length. The model may be given in state-space form.

A state of the modular converter may be any vector of quantities related to the evolution of currents and/or voltages in the modular converter (and optionally the load). A state or state vector of the converter may comprise at least one of an upper and lower branch current and/or voltage and a DC link current and/or voltage, an output current and/or voltage and a circulating current. All these voltages and/or currents for an actual time step may be measured in the modular converter or may be estimated from other quantities. These voltages and/or currents may be used for determining, estimating and/or calculating the future state of the modular converter.

The objective function may be a real-valued, scalar function implemented in the first control stage. The objective function may penalize differences between the control input reference vector at a time step and the predicted evolution of the control input vector at this time step. The objective function may be based on a cost value associated with switching costs of the converter modules. In such a way, a scalar cost value or performance index is associated with the predicted control actions and the corresponding predicted system response. For example, a penalty on manipulating a commanded branch voltage may be used, as well as a penalty on a predicted current error (for example a difference between the input current reference vector and the predicted evolution of the input current vector).

The first stage may minimize the objective function with respect to constraints and the dynamical evolution in time of the prediction model Summarized, in the first stage, the dynamics of the modular converter may be predicted, which may result in an optimal sequence of control actions.

All the control stages of the method may be implemented in a controller of the modular converter. This controller may be adapted for manipulating the branch voltages of the modular converter such that the following control objectives may be achieved:

Currents associated with the control input vector may be regulated along their given references (associated with the control input reference vector). For example, there may be five currents to be regulated, assuming a three-phase modular converter with a load, whose star point is not connected to ground. These five currents may be either five branch currents (the sixth branch current depends on the other five currents) or two load currents plus three circulating currents.

During transient operating conditions, including step changes in the load current references and in the presence of external disturbances, very short current response times may be achieved.

Constraints on the currents may be imposed and met, such as upper constraints and rate constraints on the branch, load, circulating and DC-link currents. Moreover, per phase leg, the sum of the upper and lower commanded branch voltages may be less than the DC-link voltage. Additional constraints on voltages and currents may be imposed, for example regarding the load.

According to an embodiment of the invention, the control input reference vector is a current reference vector and the control input vector is an actual current vector. The control input parameter vector may be an actual voltage vector, i.e. a vector of actual determined and/or measured voltages values. The control output reference vector may be a voltage reference vector. The control method may be a method controlling currents by manipulating (branch) voltages.

According to an embodiment of the invention, a sequence of future states or future state vectors is predicted for a plurality of time steps in the future, i.e. over a prediction horizon with a length of more than one time step. The control output reference vector may be determined from the next future state associated with the next time step, for example by solving the underlying mathematical optimization problem, which may be a quadratic program (QP). Moreover, a receding horizon policy may be used for determining the next control action for the next time step. This may mean that only the first element of the optimal sequence of control actions is implemented, i.e. used for driving the switches of the converter modules. At the next time step, new measurements may be obtained and the optimization problem may be solved again over a shifted prediction horizon.

According to an embodiment of the invention, the prediction model is based on linear equations relating voltages and/or currents at a time step with voltages and/or currents at a next time step. For example, the equations may be derived from the topology of the modular converter and Kirchhoff's laws.

According to an embodiment of the invention, the prediction model comprises a model of the converter modules and/or a model of the load. For example, the prediction model may model capacitors of the converter modules and may be adapted to predict an evolution of the capacitor voltages. The prediction model may comprise a model of the load and may be adapted to predict an evolution of a load (grid) voltage. Models of higher order load systems, including AC machines, loads with filters, loads with long cables, loads with transformers, etc. may be included in the prediction model.

According to an embodiment of the invention, the method further comprises the step of: compensating a time delay caused by the determination of the control output reference vector by predicting currents and/or voltages, for example the control input reference vector and the control input vector, at the next time step with the use of actual currents and/or, for example the actual control output vector, the actual control input reference vector and the actual control input vector. The computation of the next control action usually takes most of the time of one time step. By starting the prediction with voltages and/or currents predicted for the next time step, the control output reference vector may be calculated such that the control action (i.e. the switching commands) are applied at the time, the prediction has started from.

According to an embodiment of the invention, the objective function minimizes a change in an evolution of the control output reference vector over time. For example, in the case the control output reference vector comprises voltages, the objective function minimizes voltage changes in the evolution of these voltages over time. For example, the objective function may comprise a term in which a norm is applied to the difference between two consecutive control output reference vectors.

According to an embodiment of the invention, the objective function is based on a quadratic norm. In such a way, components of the current/and or voltage vectors may be weighting differently. For example, the control input vector may comprise branch currents, and circulating currents, which may be weighted with different weights. In this case, solving the prediction model may result in a quadratic programming problem.

According to an embodiment of the invention, the objective function is based on a linear norm. In this case, solving the prediction model may result in a linear programming problem, which may be fast to solve.

According to an embodiment of the invention, the method further comprises the step of: determining a voltage vector from the control output reference vector in a second control stage with a modulator; and controlling the converter modules by generating switching signals from the voltage vector in a third control stage. The control method may be applied in a modular AC-DC, DC-AC and AC-AC converter with a modulator.

According to an embodiment of the invention, the method further comprises the step of: controlling the converter modules by generating switching signals from a rounded control output reference vector. The voltage reference vector input to the third control stage may be generated by only rounding the output reference vector (for example a voltage reference vector). In such a way, the switching signals may be generated directly from the output reference vector without a modulator.

For modular multi-level converters, the number of converter modules per branch may be very high. A total branch voltage, which may be defined as the sum of the capacitor voltages of module capacitors connected to the branch, may then be approximated to be real-valued, rather than discrete.

In such a modular multi-level converter each converter modules of the modular multi-level converter comprises two power connectors, at least two power semiconductors and a capacitor, wherein the power connectors are short-circuited in a first switching state of the power semiconductors and are connected to the capacitor in a second switching state of the power semiconductors.

Within a branch of the modular multi-level converter the converter modules are serially connected by their power connectors.

According to an embodiment of the invention, the method further comprises the step of: detecting a converter module with a fault; short-circuiting the detected converter module; and removing the short-circuited converter model from the prediction model. The control method may use an automatic reconfiguration of the prediction model, when the topology of the modular converter changes.

For example, the converter modules of the modular converter and/or the load may be monitored in real-time. If a converter module fails and its terminals are shorted to bypass it, the number of converter modules available may be automatically updated and the internal prediction model of the controller may be adjusted accordingly. As a result, the control method may take the fact that some modules might be shortened into account and may use switching actions that, within the physical limitations of the converter, compensate for these shortened modules. Similarly, if a fault, disturbance and/or imbalance etc. occurs at the load, the prediction model is updated accordingly, too, and the controller compensates for this.

A further aspect of the invention relates to a controller for controlling a modular converter, which is adapted to perform the first stage of the control method.

For example, the control method may be implemented on any computational hardware including DSPs, FPGAs, CPUs and processor cores. Also the other stage of the control method may be implemented in a separate controller.

According to an embodiment of the invention, the controller is adapted to perform the following steps: predicting at least one future state of the modular converter with a prediction model of the modular converter, wherein the prediction model is adapted for calculating the future state of the modular converter based on an actual state of the converter, a state of the modular converter comprising current values and/or voltage values of the modular converter and/or load; optimizing the at least one future state with respect to an objective function, in particular subject to constraints and the dynamical evolution of the prediction model, wherein the objective function is based a cost value associated with switching costs or an switching effort of converter modules of the modular converter; and determining a control output reference vector from the future state.

A further aspect of the invention relates to a computer program that, when being executed by a processor, is adapted to perform the steps of the method the controller is adapted to perform and/or the steps of the method as described in the above and in the following. A further aspect of the invention relates to a computer-readable medium on which such a computer program is stored.

A computer-readable medium may be a floppy disk, a hard disk, an USB (Universal Serial Bus) storage device, a RAM (Random Access Memory), a ROM (Read Only memory) and an EPROM (Erasable Programmable Read Only Memory). A computer-readable medium may also be a data communication network, e.g. the Internet, which allows downloading a program code.

A further aspect of the invention relates to a modular converter for supplying a load with electrical voltages and/or currents.

According to an embodiment of the invention, the converter comprises a plurality of converter modules comprising semiconductor switches and a capacitor; a first controller as for performing the first stage of the control method as described in the above and in the following, the first controller generating a control output reference vector; and a further controller for generating switching signals for the converter modules based on the control output reference vector.

According to an embodiment of the invention, the modular converter is a modular multi-level converter.

It has to be understood that features of the method as described in the above and in the following may be features of the controller and/or the modular converter as described in the above and in the following.

Summarized, a method and a controller for controlling a modular converter are described, which may use the concepts of model predictive control (MPC). The controller may be seen as a model predictive current controller (MPCC), which may be adapted for regulating the branch, phase and/or circulating currents around their given references, by manipulating the total (continuous-valued) branch voltages. Upper current constraints as well as rate constraints may be addressed by the MPC method. The current references may be provided by an outer loop. A modulator may be used to translate the branch voltage commands to integer numbers, which refer to the number of modules per branch being turned on. A subsequent balancing method may be used to maintain the capacitor voltages around their references and to decide on the individual modules being turned on and off.

The proposed MPC method may be used to address a current control problem of modular multi-level converters with a large number of converter modules per converter branch. The controller may achieve very short response times during transients and may require only a modest computational power. The MPC method may be used to provide fast torque control for a modular multi-level converter driving an AC rotating machine.

The method may be used for all applications of a modular multi-level converter, including variable speed drives, high-voltage direct current transmission, flexible AC transmission systems, static synchronous compensators, grid-interfaces for battery energy storage systems or photovoltaic modules, traction applications, etc. The control method is highly flexible allowing one to incorporate and address different control objectives and operation requirements.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

In principle, identical parts are provided with the same reference symbols in the figures.

Detailed Description of Exemplary Embodiments

Figure 1:
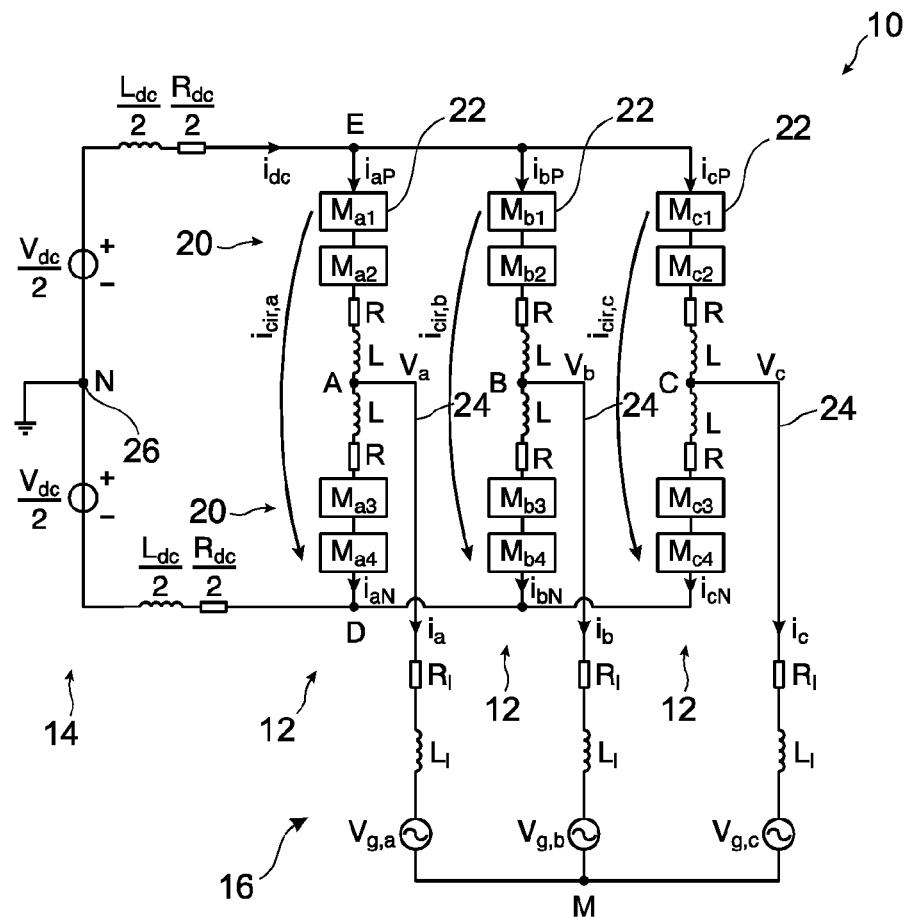
FIG. 1 schematically shows a modular converter according to an embodiment of the invention.

FIG. 1 schematically shows a modular converter 10 with three converter phase legs 12 that interconnect a DC link 14 with an active three-phase resistive-inductive (RL) load 16. Each of the phase legs 12 comprises an upper and a lower branch 20 interconnecting the positive and negative sides of the DC link 14 with one phase of the load 16. The modular converter 10 is a modular multi-level converter with n=2 series-connected converter modules 22 per branch 20.

In general, the modular converter 10 may comprise converter modules 22, $M_{pq}$, with p∈{a, b, c} and q∈{1, 2, ... n}, where n is the number of converter modules 22 per phase leg 12. The modular converter 10 may comprise any number of converter modules 22 per phase leg 12. Each branch 20 comprises n/2 modules 22, a resistor R, that models conduction losses and a branch inductor L.

The DC link 14 is shown with a DC supply inductor $L_{dc}$ and a resistor $R_{dc}$ that model the parasitic inductance and resistance, respectively. The modular converter 10 may provide n+1 voltage levels at each of its output terminals 24, $V_p$, p∈{a, b, c}, with respect to the supply ground 26, N. The output terminals 24 are connected to the load 16, which comprises load inductor $L_l$ in series with a load resistor $R_l$ and the grid voltage $V_{g,p}$.

Figure 2:
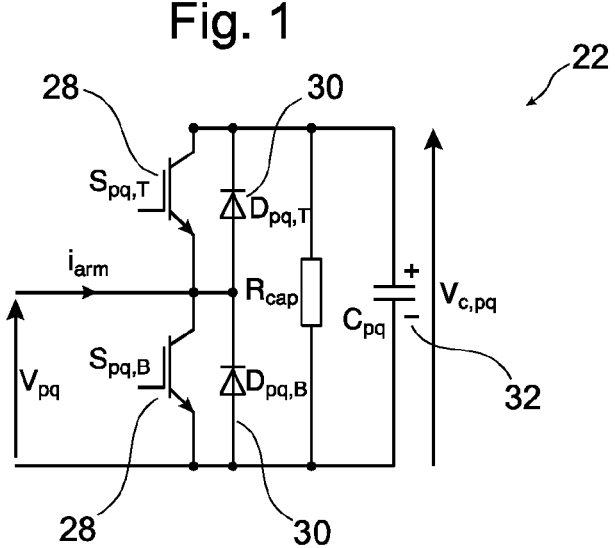
FIG. 2 schematically shows a converter module for a modular converter according to an embodiment of the invention.

FIG. 2 shows a converter module 22 or converter cell 22 of the modular converter 10. The converter module comprises two semiconductor switches 28 connected in series, which are connected in parallel to two free-wheeling diodes 30 and to a capacitor 32. It is also possible to incorporate the functionality of the free-wheeling diode into the semiconductor switch.

Each converter module 22 acts as a chopper cell with the capacitor 32, $C_{pq}$. Each converter module 22 has two switching states, $u_{pq} \in \{0,1\}$, where 1 means that the capacitor is connected to the branch 20, i.e. the upper switch 28, $S_{pq,T}$ is turned on. The operation of the two switches 28 is complementary to one another. A resistor $R_{cap}$ is shown in parallel to the capacitor 32 to model the leakage current of the capacitor 32.

Thus each converter module 22 comprises two power connectors, at least two power semiconductors 28 and the capacitor 32, wherein the power connectors are short-circuited in a first switching state of the semiconductors and are connected to the capacitor in a second switching state of the semiconductors 28.

Figure 3:
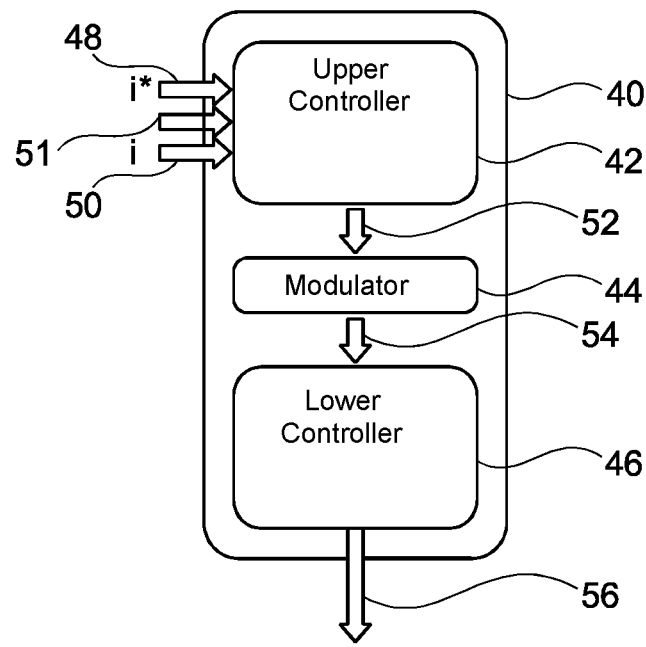
FIG. 3 schematically shows a controller for a modular converter according to an embodiment of the invention.

FIG. 3 schematically shows a controller 40 for the modular converter 10. The controller 40 comprises three controller stages 42, 44, 46, i.e. an upper (current) controller 42, a modulator 44 and a lower (balancing) controller 46.

Figure 4:
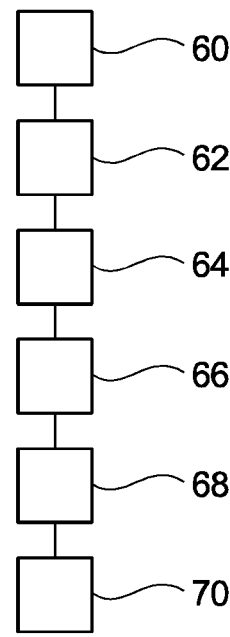
FIG. 4 shows a flow diagram for a method for controlling a modular converter according to an embodiment of the invention.

The operation of the controller 40 will be explained with reference to FIG. 4, which shows a flow diagram for controlling the modular converter 10.

In step 60, the controller 42 receives a controller input reference vector 48 in the form of a current reference vector 48, i*, a controller input vector 50 in the form of a current vector 50, i and a controller input parameter vector 51 in the form of a parameter vector 51, $v_p$. For example, the current vector 50 comprises one or more actual currents measured in the circuit of the modular converter 10 or estimated from other quantities measured in the circuit of the converter 10.

In steps 62, 64, 66, the controller 42 determines a control output reference vector 52 in the form of a voltage reference vector 52 from the control input reference vector 48, the control input vector 50 and the control input parameter vector 51. Steps 60, 62, 64 will be explained in the following in more detail.

In step 68, a voltage vector 54 is derived from the control output vector 52. For example, an optional modulator 44 may perform a pulse-width modulation method or a space vector modulation method for generating a voltage vector 54 from the voltage reference vector 52.

Alternatively, the voltage vector 54 may be determined based on a rounding of the control output vector 52. For example, for a sufficiently large number of converter modules 22 per branch 20, the modulator 44 may be replaced by a simple rounding scheme. Such a rounding scheme may round a real-valued branch voltage to an integer number, corresponding to the number of converter modules 22 per branch 20 being turned on.

In step 70, the balancing controller 46 directly controls the converter modules 22 by generating switching or gating signals 56 for the switches 28 from the voltage vector 54.

Figure 5:
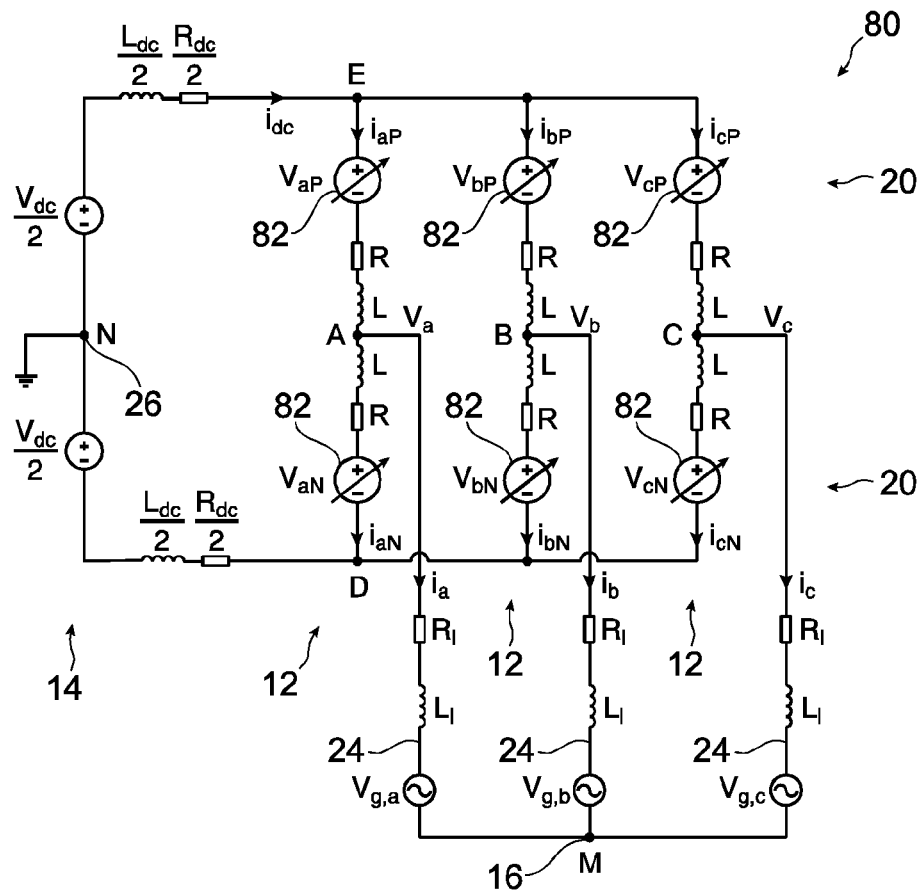
FIG. 5 schematically shows a prediction model according to an embodiment of the invention.

FIG. 5 shows a prediction model 80 for the modular converter 10, which is used in step 62 to predict future states of the modular converter 10.

In general, the prediction model 80 may model a part of the circuitry of the modular converter 10 and the load 16. For example, with Kirchhoff's laws, equations may be derived from the circuitry of the converter 10 that present a part of the prediction model 80.

Furthermore, the converter modules 22 of one branch 20 may be treated as a voltage source 82 that has to be regulated by the controller 40.

For example, for the topology shown in FIG. 1, the output equations for the load current in phases a, b and c are as follows:

$$i_a(t) = i_{aP}(t) - i_{aN}(t)$$

$$i_b(t) = i_{bP}(t) - i_{bN}(t)$$

$$i_c(t) = i_{aP}(t) - i_{aN}(t) - i_{bP}(t) + i_{bN}(t)$$

The equation which defines the circulating currents in phases a, b and c is as follows:

$$i_{cir,p}(t) = \frac{i_{pP}(t)}{2} + \frac{i_{pN}(t)}{2} - \frac{i_{dc}}{3},$$

$$p \in \{a, b, c\}$$

These state equations may be derived by applying Kirchhoff's voltage law around the five circuit meshes of the circuit shown in FIG. 1. Note that these equations are independent from the number of converter modules 22 in one branch 20.

The model state vector $x=[i_{aP}\ i_{aN}\ i_{bP}\ i_{bN}\ i_{dc}]^T$ of the prediction model 80 includes the upper branch currents $i_{aP}$, $i_{aN}$ and the lower branch currents $i_{bP}$, $i_{bN}$ of phase legs a and b, as well as the DC link current $i_{dc}$.

The model input vector $u=[v_{aP}\ v_{aN}\ V_{bP}\ V_{bN}\ V_{cP}\ V_{cN}]^T \in \mathbb{R}^6$ of the prediction model 80 comprises the six branch voltages $v_{aP}$, $v_{aN}$, $v_{bP}$, $v_{bN}$, $v_{cP}$, $v_{cN}$, which are assumed to be real-valued.

The three-phase grid voltage $v_{ga}$, $v_{gb}$, $v_{gc}$ of the load 16 and the DC link voltage $v_{dc}$ constitute the parameter vector $v_p=[v_{ga}\ v_{gb}\ v_{gc}\ v_{dc}]^T$ of the prediction model 80.

The model output vector y has five elements. One choice is to use two load currents, either $i_a$ and $i_b$, or $i_\alpha$ and $i_\beta$, i.e. the load currents represented in the stationary orthogonal coordinate system, along with the three circulating currents $i_{cir,a}$, $i_{cir,b}$, $i_{cir,c}$. An alternative choice for the model output vector y is to use the five branch currents of the model state vector x.

In general, the state of the modular converter 10 may be modeled with the branch currents $i_{aP}$, $i_{aN}$, $i_{bP}$, $i_{bN}$, $i_{cP}$, $i_{cN}$, the branch voltages $v_{aP}$, $v_{aN}$, $v_{bP}$, $V_{bN}$, $v_{cP}$, $v_{cN}$, the DC link current $i_{dc}$, the DC link voltage $v_{dc}$, the output currents $i_a$, $i_b$, $i_c$, and the grid voltages $v_{ga}$, $v_{gb}$, $v_{gc}$ of the load 16. However, these quantities are not independent from each other.

Figure 6:
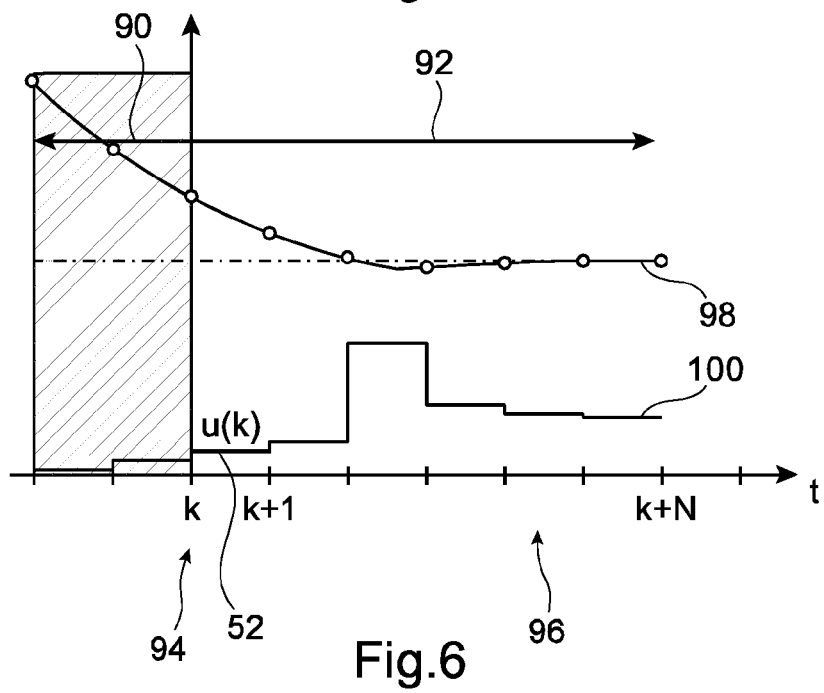
FIG. 6 shows a diagram with sequences of control actions and predicted output sequences according to an embodiment of the invention.

FIG. 6 shows the evolution of the state of the modular converter 10 over the time t, which is depicted to the right. FIG. 6 shows the past 90 to the left of the y-axis, and a prediction horizon 92 to the right of the y-axis.

For example, a prediction model 80 may use a discrete time state-space representation with discrete time steps k. Then from an actual state 94 at time step k, a sequence of future states 96 is predicted for the time steps k+1 to k+N, where N is the length of the prediction horizon 92.

In particular, FIG. 6 schematically shows the predicted sequence 98 of model output vectors y and the predicted sequence 100 of model input vectors u for the time steps k to k+N−1.

For the topology shown in FIG. 1 and FIG. 5, a prediction model 80 of the following form can be derived. Note that the $B_1$-matrix is time-varying, since it includes the voltages of the capacitor 32 of the branch modules 22.

$$x(k+1)=Ax(k)+B_1(k)u(k)+B_2v_p(k)y(k+1)=Cx(k+1)$$

This model assumes that the voltages of the capacitors 32 exhibit minor variations within the time-frame of the prediction horizon 92.

However, if the prediction horizon 92 is long and/or the capacitors 32 are relatively small, it may be beneficial to explicitly model the voltage variations of the capacitors 32. This may be done by extending the model state vector x by adding the sum of the capacitor voltages of the branches 20. The resulting prediction model 80 is of first order.

The evolution of the grid voltages may be included in the prediction model 80, by adding the two states $v_{g\alpha}$ and $v_{g\beta}$ to the model state vector x and by modeling the rotation of the grid voltage vector, whose rotational speed is proportional to the grid frequency.

In general, the prediction model 80 is adapted for calculating future states 96 of the modular converter 10 based on an actual state 94 of the modular converter.

It has to be noted that the prediction model 80 may be formulated in different coordinate systems, including abc, αβ or dq, or a combination thereof.

In step 64, the predicted future states 96 are optimized with respect to an objective function. It has to be noted, that the steps 62 and 64 may be performed in one operation by numerically solving a mathematical programming problem defined by matrix equations, further constraints and the objective function.

The objective function associates a scalar performance index with different predicted scenarios, i.e. the objective function is a real-valued function of the states and control actions of the modular converter 10.

Typically, the objective function includes penalties on the predicted evolution of the tracking error and the (change in the) control effort over the prediction horizon N.

$$J(x(k)) = \sum_{l=k}^{k+N-1} |y^*(l) - y(l)|_Q^2 + |u(l) - u(l-1)|_R^2$$

Note that in the above defined model, y* denotes the time-varying current reference vector. The matrices Q and R constitute penalty matrices on the current error and the change in the manipulated variable.

In particular, the objective function is based on differences between the control input reference vector 48 at time step l and the evolution of the control input vector 50 at time step l. Additionally, the objective function optimizes a cost value associated with switching costs of the converter modules 10 by minimizing the differences between the model input vectors u at time step l and time step l-I.

The objective function is minimized subject to the evolution of the prediction model 80 from time-step k until k+N−1. Moreover, constraints on the currents, which are included in x and y, may be included, as well as constraints on u. Upper and lower constraints as well as rate constraints can be considered. Since the state-space model is linear, the cost function is quadratic and the constraints are linear, the resulting optimization problem is a so-called quadratic program (QP). The QP can be formulated and solved efficiently, e.g. by using an active set method or a fast gradient search method.

The result of the optimization step 64 is the sequence 100 of optimal model control inputs $U=[u^T(k)u^T(k+1) \ldots u^T(k+N-1)]^T$ at time-step k.

In step 66, the controller 42 determines the control output reference vector 52 from the sequence 100 of future control actions by taking the first element u(k) of the first model input vector u at time step k. The first element u(k) is the output reference vector 52.

Only the first element u(k) of the sequence 100 of optimal control inputs is implemented at time-step k and sent to the controller 44. At the next time-step k+1, new measurements (or estimates) are obtained and the optimization problem is solved again over a shifted prediction horizon 92. This so-called receding horizon policy provides feedback and ensures that the controller 42 is robust to parameter uncertainties.

Further embodiments of the control method are explained in the following:

A time delay caused by the computation of the control output reference vector 52 may be compensated for. This time delay typically amounts to the length of one sampling interval. By using the last control input and the model state vector x(k) at time step k, the model state vector x(k+1) at time step k+1 may be predicted, for which the prediction model 80 is solved.

In step 64, a (piecewise) linear (instead of a quadratic) cost function may be used, for example based on absolute values and/or maximal values, leading to a linear program (LP) instead of a QP.

In step 62, additional control loops may be added. For example, in step 62 the occurrence of faults, loss of modules, voltage dips, load imbalances, disturbances and/or grid (or load) asymmetries, etc. may be monitored. If a fault or asymmetry is detected, the controller 42 adjusts its control actions so as to accommodate for this event within the physical limits, providing automatic controller reconfiguration. For example, the prediction model 80 is updated to a new topology taking into account the fault or asymmetry.

When modeling the prediction model 80, a higher order load system 16 may be considered, including AC machines, grids with transformers and loads with filters. To address such higher order systems, the prediction model 80, the model state vector x, the parameter vector $v_p$ and the output vector y may be augmented accordingly.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for controlling a modular converter, the modular converter including a plurality of converter modules configured for converting an input voltage into an output voltage to be supplied to a load, the method comprising:
receiving a control input reference vector, a control input vector and a control input parameter vector;
determining a control output reference vector from the control input reference vector, the control input vector and the control input parameter vector in a first control stage; and
controlling the converter modules by generating switching signals based on the control output reference vector in a further control stage;
wherein the control output reference vector is determined by:
predicting at least one future state of the modular converter with a prediction model of the modular converter, wherein the prediction model is adapted for calculating the future state of the modular converter based on an actual state of the modular converter, a state of the modular converter having current values and/or voltage values of the modular converter;
enhancing the at least one future state with respect to an objective function by minimizing the objective function with respect to a dynamical evolution in time of the prediction model, wherein the objective function is based on a cost value associated with switching costs of the converter modules, the objective function penalizes differences between the control input reference vector at a time step and a predicted evolution of the control input vector at the time step, and the objective function minimizes a change in evolution of the control output reference vector; and
determining the control output reference vector from the future state.

2. The method of claim 1, wherein the modular converter controlled by the method is a modular multi-level converter wherein each converter module of the modular multi-level converter includes two power connectors, at least two power semiconductors and a capacitor, wherein the power connectors are short-circuited in a first switching state of the power semiconductors and are connected to the capacitor in a second switching state of the power semiconductors.

3. The method of claim 2, comprising:
determining a voltage vector from the control output reference vector in a second control stage with a modulator; and
controlling the converter modules by generating switching signals from the voltage vector in a third control stage.

4. The method of claim 3,
wherein the control input reference vector is a current reference vector, the control input vector is an actual current vector and the control input parameter vector is an actual voltage vector; and/or
wherein the control output reference vector is a voltage reference vector.

5. The method of claim 4,
wherein a sequence of future states is predicted for a plurality of time steps in the future; and
wherein the control output reference vector is determined from a next future state associated with a next time step.

6. The method of claim 5,
wherein the prediction model is based on linear equations relating voltages and/or currents at a time step with voltages and/or currents at a next time step.

7. The method of claim 1, comprising:
determining a voltage vector from the control output reference vector in a second control stage with a modulator; and
controlling the converter modules by generating switching signals from the voltage vector in a third control stage.

8. The method of claim 1,
wherein the control input reference vector is a current reference vector, the control input vector is an actual current vector and the control input parameter vector is an actual voltage vector; and/or
wherein the control output reference vector is a voltage reference vector.

9. The method of claim 1,
wherein a sequence of future states is predicted for a plurality of time steps in the future; and wherein the control output reference vector is determined from a next future state associated with a next time step.

10. The method of claim 1,
wherein the prediction model is based on linear equations relating voltages and/or currents at a time step with voltages and/or currents at a next time step.

11. The method of claim 1,
wherein the prediction model includes a model of the converter modules and/or a model of the load.

12. The method of claim 1, comprising:
compensating a time delay caused by the determining of the control output reference vector by predicting currents at a next time step using actual voltages and/or currents.

13. The method of claim 1,
wherein the objective function is based on a vector norm.

14. The method of claim 1,
wherein the objective function is based on a quadratic and/or linear norm.

15. The method of claim 1, comprising:
controlling the converter modules by generating switching signals from a rounded control output reference vector.

16. The method of claim 1, comprising:
detecting a converter module with a fault;
short-circuiting the detected converter module; and
removing the short-circuited converter module from the prediction model.

17. A controller for controlling a modular converter, wherein the controller is configured for performing the steps of:
predicting at least one future state of the modular converter with a prediction model of the modular converter, wherein the prediction model is adapted for calculating the future state of the modular converter based on an actual state of the converter, a state of the modular converter having current values and/or voltage values of the modular converter;
enhancing the at least one future state with respect to an objective function by minimizing the objective function with respect to a dynamical evolution in time of the prediction model, wherein the objective is based on a cost value associated with switching costs of converter modules of the modular converter, the objective function penalizes differences between the control input reference vector at a time step and a predicted evolution of the control input vector at the time step, and the objective function minimizes a change in evolution of the control output reference vector; and
determining a control output reference vector from the future state.

18. A modular converter for supplying a load with electrical voltages, the modular converter comprising:
a plurality of converter modules having semiconductor switches and a capacitor;
a first controller according to claim 17 for generating a control output reference vector; and
a further controller for generating switching signals for the converter modules based on the control output reference vector.

19. The modular converter of claim 18,
wherein the modular converter is a modular multi-level converter.

* * * * *